(12) United States Patent
Kawasaki et al.

(10) Patent No.: US 6,389,170 B1
(45) Date of Patent: May 14, 2002

(54) IMAGE DATA PROCESSING APPARATUS AND IMAGE DATA PROCESSING METHOD

(75) Inventors: Eiichiro Kawasaki; Takeshi Morikawa; Eiichi Yoshida; Akio Nakajima, all of Toyokawa; Tomoyuki Atsumi; Yoshikazu Ikenoue, both of Toyohashi, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/153,852

(22) Filed: Sep. 16, 1998

(30) Foreign Application Priority Data

Sep. 19, 1997 (JP) ............................................... 9-255257

(51) Int. Cl.$^7$ ................................................ G06K 9/36
(52) U.S. Cl. ........................ 382/232; 358/400; 358/402; 358/426; 358/433; 358/468
(58) Field of Search ............................... 382/232, 233, 382/235, 239, 296, 305, 234, 297; 358/433, 434, 426, 432, 445, 403, 408, 539, 442, 468, 401, 444, 296, 1.9, 1.15, 400, 440, 402, 449

(56) References Cited

U.S. PATENT DOCUMENTS

| | | | |
|---|---|---|---|
| 5,033,106 A | | 7/1991 | Kita |
| 5,148,292 A | | 9/1992 | Kutaragi |
| 5,420,693 A | * | 5/1995 | Horiuchi et al. ............. 358/433 |
| 5,479,391 A | * | 12/1995 | Horibe et al. .................. 369/83 |
| 5,715,329 A | * | 2/1998 | Murata ........................ 382/166 |
| 5,748,862 A | * | 5/1998 | Ohno et al. .................. 395/115 |
| 5,751,865 A | | 5/1998 | Micco et al. |
| 5,828,788 A | * | 10/1998 | Chiang et al. ............... 382/239 |
| 5,901,277 A | * | 5/1999 | Chu et al. ................... 358/1.15 |
| 5,914,787 A | * | 6/1999 | Satoh et al. ................. 358/402 |
| 5,987,177 A | * | 11/1999 | Nishida ....................... 382/232 |
| 6,061,473 A | * | 5/2000 | Chen et al. .................. 382/235 |

* cited by examiner

Primary Examiner—Bhavesh Mehta
Assistant Examiner—Ali Bayat
(74) Attorney, Agent, or Firm—Burns, Doane, Swecker & Mathis, LLP (57) ABSTRACT

In the image data processing of the digital copying machine (M), the image data is assigned to the expanders (30,31) in such a manner that the expansion time of each of the expanders (30,31) is close to one another. Thus, because the difference of the expansion time between the expanders (30,31) is very close to one another, both of the expanders (30,31) can be efficiently used so that the timing when printing can be started is quickened. In consequence, the speed of expansion processing or print processing is improved.

17 Claims, 12 Drawing Sheets

IMAGE TO BE READ

⟨ COMPRESSION ⟩

1ST COMPRESSOR (1)→(2)→(5)→ (6)→ (9)→(10)→(13)→(14)
2ND COMPRESSOR (3)→(4)→(7)→ (8)→(11)→(12)→(15)→(16)

⟨ CONVENTIONAL EXPANSION ⟩    TOTAL EXPANSION
                                TIME
1ST EXPANDER (1)→(2)→(5)→(6)→ (9)→(10)→(13)→(14)    31
             [7]  [6] [3] [4]  [1]  [2]  [6]  [2]       DIFFERENCE
                                                          21
2ND EXPANDER (3)→(4)→(7)→(8)→(11)→(12)→(15)→(16)    52
             [8]  [3] [4] [9]  [9]  [6]  [5]  [8]

⟨ EXPANSION OF PRESENT EMBODIMENT⟩   TOTAL EXPANSION
                                      TIME
1ST EXPANDER (1)→(4)→(5)→(6)→ (8)→(12)→(14)→(15)    39
             [7]  [3] [3] [4]  [9]  [6]  [2]  [5]       DIFFERENCE
                                                          5
2ND EXPANDER (2)→(3)→(7)→(9)→(10)→(11)→(13)→(16)    44
             [6]  [8] [4] [1]  [2]  [9]  [6]  [8]

Fig.6

STEP 1 : THE FIRST BLOCK (1) IS ASSIGNED TO THE 1ST EXPANDER

STEP 2 : THE FOLLOWING BLOCK (2) IS ASSIGNED TO THE 2ND EXPANDER
WHOSE TOTAL EXPANSION TIME IS LESS

STEP 3 : THE FOLLOWING BLOCK (3) IS ASSIGNED TO THE 2ND EXPANDER
WHOSE TOTAL EXPANSION TIME IS LESS

STEP 4 : THE FOLLOWING BLOCK (4) IS ASSIGNED TO THE 1ST EXPANDER
WHOSE TOTAL EXPANSION TIME IS LESS

STEP 5 : THE FOLLOWING BLOCK (5) IS ASSIGNED TO THE 1ST EXPANDER
WHOSE TOTAL EXPANSION TIME IS LESS

IMAGE DATA PROCESSING APPARATUS AND IMAGE DATA PROCESSING METHOD

This application is based on application Ser. No. 9-255257 filed in Japan, the contents of which is hereby incorporated by reference.

BACKGROUND OF THE INVENTION

1. Field of the Invention

The present invention relates to a device for processing image data such as a digital copying machine with an image memory and to a method of processing image data. More particularly, it relates to improvements in techniques of controlling the image memory of the digital copying machine.

2. Description of the Prior Art

In recent years, there has been proposed a digital copying machine with an image memory, in which image data obtained by reading an original document is divided into a plurality of blocks (or a plurality of bands each having a specified number of lines) so as to be compressed at every block, and then the compressed blocks are expanded prior to completion of the compression of the whole image data, thereby enabling it to start printing earlier.

Moreover, in order to increase the copying speed further, there has also been proposed a digital copying machine in which printing of image data starts during expansion processing of the compressed image data.

Further, there has been proposed a digital copying machine which performs expression processing by using a plurality of expanders so as to enable it to start printing much earlier.

Thus, when printing of image data is to be started before expansion of the image data to be output is completed as described above, timing of starting to print must be set carefully so that the progress of printing does not outrun the progress of expansion. Hereupon, if the printing speed is slower than the expanding speed, printing can be started immediately after starting the expansion of the image data because progress of printing cannot outrun the progress of expansion. However, if the printing speed is faster than the expanding speed, timing of starting to print must be set by predicting the time when expansion will be completed so that the progress of printing does not outrun the progress of expansion.

Moreover, when the image data, which is divided along the vertical direction (auxiliary scanning direction) and horizontal direction (principal scanning direction) into a plurality of blocks of predetermined size respectively, is expanded by using a plurality of expanders, and then printing is started before the completion of the expansion processing, the expansion time of each of the blocks differs from one another. Therefore, in each of all the blocks, timing of starting to print must be carefully set so that the progress of printing does not outrun the progress of expansion.

For example, let us suppose that the image data is divided along the vertical direction into four blocks and also divided along the horizontal direction into four blocks, namely divided into sixteen blocks in total, and then compressed at every block. Further, let us suppose that two expanders (first expander and second expander) are used in the expansion processing, the image data in the left two columns of blocks are expanded by the first expander, and the image data in the right two columns of blocks are expanded by the second expander. Thus, in the above-mentioned case, the expansion processing can be performed in higher expanding speed as about twice as in the case where only one expander is used.

However, when each of the blocks to be expanded is simply assigned to either one of the two expanders as described above, if the time required for expanding the image data of each of the left two columns of blocks is different from that of each of the right two columns of blocks, the total processing time of the first expander differs from that of the second expander. Therefore, the both expanders do not complete expansion processing at the same time. In consequence, it must occur such a condition that one of the two expanders completes expansion processing earlier in comparison with the other expander so that the expander which completes expansion earlier cannot perform any processing till the other expander completes expansion processing. Therefore, a plurality of expanders (two expanders) cannot efficiently function.

Further, in the above-mentioned case, it is obliged to set the timing to start outputting data according to the expander which completes expansion later. Therefore, the timing at which outputting can be started may be delayed in comparison with the case in which all the expanders complete their processing at the same time. Hereupon, if the size of each of the expanders differs from one another, or the number of the blocks which are assigned to each of the expanders differs from one another, the same disadvantage may also occur.

SUMMARY OF THE INVENTION

The present invention has been developed to solve the problems of the prior art described above, and has an object of providing a device (such as a digital copying machine) or method for processing image data, in which the image data is divided into a plurality of blocks, compressed at every block (namely, in the unit of block), and is expanded at every block by a plurality of expanders, wherein the timing which can start printing is quickened as early as possible.

According to the first aspect of the present invention, there is provided an image data processing apparatus for processing a digital image data including, (A) a plurality of expanders for receiving a compressed image data divided into a plurality of blocks and then expanding the compressed image data to output, and (B) a controller for assigning each of the blocks of compressed image data to the expanders according to a time which each of the expanders requires to expand the compressed image data, (C) wherein each of the expanders expands the blocks of image data assigned thereto.

In the apparatus it is preferable that the controller has a predictor for predicting a time which each of the expanders requires to expand the blocks of image data which have been already assigned thereto, the controller assigning each of the blocks to the expanders according to the time predicted by the predictor.

Further, in the apparatus it is more preferable that the predictor predicts a time required for expanding each of the blocks of image data on the basis of a time consumed for compressing the block of image data.

Moreover, the apparatus may includes a compressor for dividing the image data into a plurality of blocks to compresses the image data in the unit of block, wherein the image data compressed by the compressor is input to the expanders. Hereupon, the number of the compressor may be plural.

According to the second aspect of the present invention, there is provided an image data processing apparatus for processing a digital image data including, (A) a compressor for receiving an image data and then dividing the image data into a plurality of blocks to compress the image data in the unit of block, (B) a memory for storing the image data compressed by the compressor, (C) a plurality of expanders for expanding the compressed image data, (D) a controller for reading the compressed image data in the unit of block from the memory to assign the compressed image data to the expanders, the controller calculating a time which each of the expanders requires to expand the blocks of image data which have been already assigned thereto to assign each of the blocks to any one of the expanders according to the calculated time, and (E) a synthesizer for synthesizing each of the blocks of image data expanded by the expanders to generate one image.

In the apparatus, it is preferable that the controller calculates the time which each of the expanders requires to expand the image data on the basis of a time which the compressor has consumed to compress the image data.

Further, in the apparatus, it is more preferable that the expanders simultaneously expand the block of image data assigned thereto in parallel with one another. Moreover, the apparatus may further include a printer for performing printing processing on the basis of the image data synthesized by the synthesizer. Hereupon, the apparatus may further include an image reader for reading an original image to generate the image data, the image reader outputting the read image data to the compressor.

In the apparatus, it is preferable the memory has a capacity capable of storing the image data corresponding to a plurality of original image sheets, wherein pages of the image data are sorted by controlling an order of reading the image data from the memory.

According to the third aspect of the present invention, there is provided an image data processing method of processing a digital image data including (A) the step of assigning a compressed image data, which is divided into a plurality of blocks and then compressed, to any one of a plurality of expanders, (B) the step of calculating an expansion time which each of the expanders requires to expand the blocks of image data assigned thereto in the assigning step, (C) the step of performing repeatedly the assigning step and the calculating step according to the expansion time calculated in the directly previous calculating step, and (D) the step of expanding the blocks of image data assigned to each of the expanders by driving the expanders at the same time.

The method may further include the step of printing the image data expanded in the expanding step, or include the step of reading an original image to generate the image data, and the step of compressing the image data generated in the reading step in the unit of block to generate the compressed image data to be expanded.

In the method, it is preferable that the expansion time is calculated in the calculating step according to a time which has been consumed to compress each of the blocks of image data in the compressing step.

The method may further include the step of storing the image data corresponding to a plurality of original image sheets compressed in the compressing step to a memory, and then repeatedly reading the stored image data at plural times, wherein the read image data is expanded in the expanding step.

Also in the method, it is more preferable that the image data is assigned to the expanders in such a manner that the expansion time of each of the expanders is close to one another.

According to the present invention, the difference of the total expansion time among the expanders is very close to one another. Therefore, all the expanders can be efficiently used so that the timing when printing can be started is quickened. In consequence, the speed of expansion processing or print processing is improved.

BRIEF DESCRIPTION OF THE DRAWINGS

The present invention will become more apparent from the following description with reference to the accompanying drawings, and in which.

DETAILED DESCRIPTION OF THE PREFERRED EMBODIMENTS

Hereinafter, preferred embodiments of the present invention will be concretely described.

Figure 1:
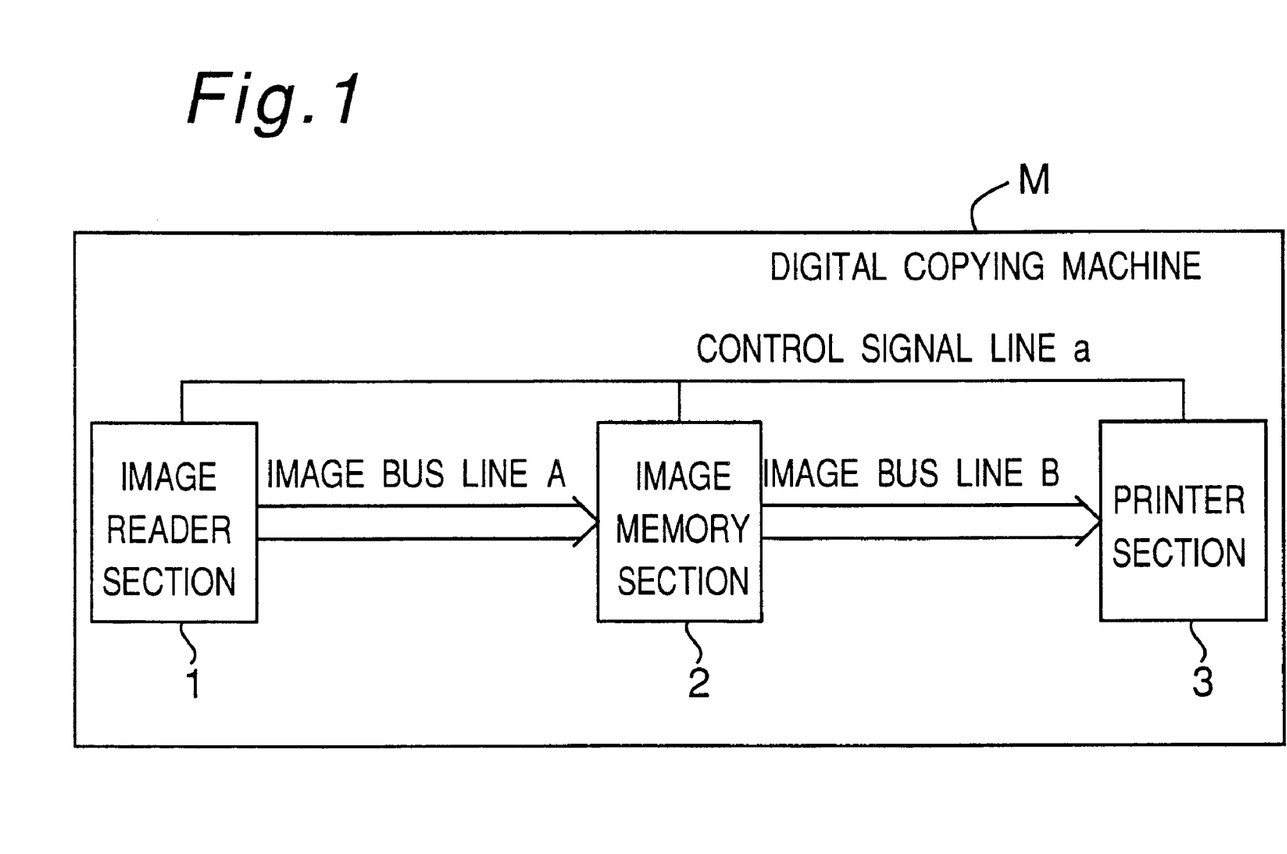
FIG. 1 is a block diagram showing the basic system construction of a digital copying machine with an image memory section according to the present invention.

FIG. 1 is a block diagram showing the basic system construction of a digital copying machine according to the present invention. At first, configuration of the digital copying machine will be described below.

As shown in FIG. 1, the digital copying machine M has an image reader section 1 which reads an original document (namely, original image) and generates image data (image information) corresponding to the original document, an image memory section 2 capable of storing the image data, generated by the image reader section 1, of several sheets of the original document, a printer section 3 which prints the image of the original document according to the image data stored in the image memory 2 and an overall control section (not shown in the drawing) which controls the entire operations of the copying machine M.

The image reader section 1 is an ordinary scanner which has been conventionally known and is capable of reading an original document by means of CCD (namely, Charge Coupled Device) or the like and generating digital image data corresponding to the original document, thereby continuously reading the original document. The image memory section 2 comprises RAM for storing the image data, a compression/expansion circuit and other components, and is capable of compressing a plurality of image data sets and storing the image data in the RAM. The printer section 3 is an ordinary printer which has been conventionally known and forms the image of the original documents on paper sheets by electrostatic printing method. Hereupon, the image reader section 1, the image memory section 2 and the printer section 3 are connected to one another by means of a control signal wire a, an image bus line A and an image bus line B.

The control signal line a is a signal line provided for feeding of an original document, reading of the original document, feeding of copy paper and setting the timing of printing operation, and is used for exchanging operation starting commands and current status signals. The image bus line A is a path for transmitting the image data generated (captured) by the image reader section 1 to the image memory section 2. On the other hand, the image bus line B is a path for transmitting the image data stored in the image memory section 2 to the printer section 3.

In the digital copying machine M, to copy an original document, a document reading command is first sent to the image reader section 1 via the control signal line a. The image reader section 1 sends image data obtained by reading the original document to the image memory section 2 via the image bus line A. The image data stored in the image memory section 2 is then sent to the printer section 3 via the image bus line B. Then, the printer section 3 forms an image of the original document on paper while keeping synchronization with the image data signal, according to the command received from the image memory section 2 via the control signal line a.

The digital copying machine M can, because of a configuration capable of storing image data of a plurality of original documents in the image memory 2, print the image of one original document repetitively or change the order of printing, by storing the image data obtained by reading the original document in the image memory 2 and repetitively sending the same image data to the printer section 3.

Figure 2:
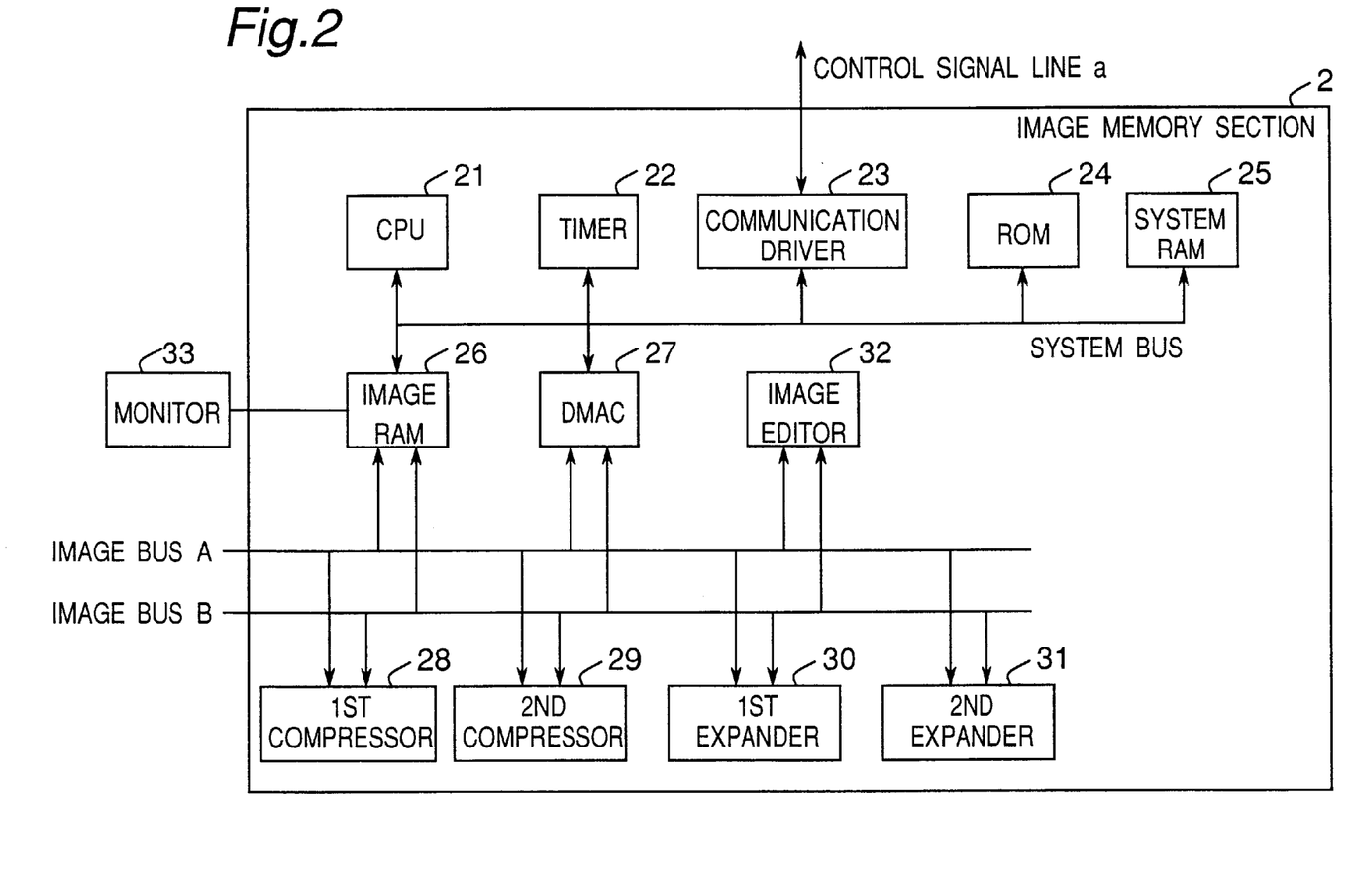
FIG. 2 is a block diagram showing the system construction of the image memory section of the digital copying machine shown in FIG. 1.

FIG. 2 is a block diagram showing the internal configuration of the image memory section 2.

In the image memory section 2, as shown in FIG. 2, CPU 21 controls the operations according to a procedure defined by a program stored in ROM 24. The image memory section 2 also communicates with the image reader section 1 and the printer section 3 via the control signal line a by means of a communication driver 23. The image memory 2 is provided with a timer 22.

The image bus line A and the image bus line B are connected to the image RAM 26, while image data is stored in the image RAM 26. Transmission of the image data is controlled by DMAC 27 (that is an abridgment of "Direct Memory Access Controller 27") which is capable of transmitting the data over several channels. Also connected to the image bus line A and the image bus line B are first compressor 28, second compressor 29, first expander 30, second expander 31 and an image editor 32 which rotates the image data, thereby making it possible to compress and expand the image data. Information on the image data stored in the image RAM 26 is stored in a system RAM 25. The system RAM 25 also stores parameters required for running the programs. Also connected to the image RAM 26 is a monitor 33.

Figure 3:
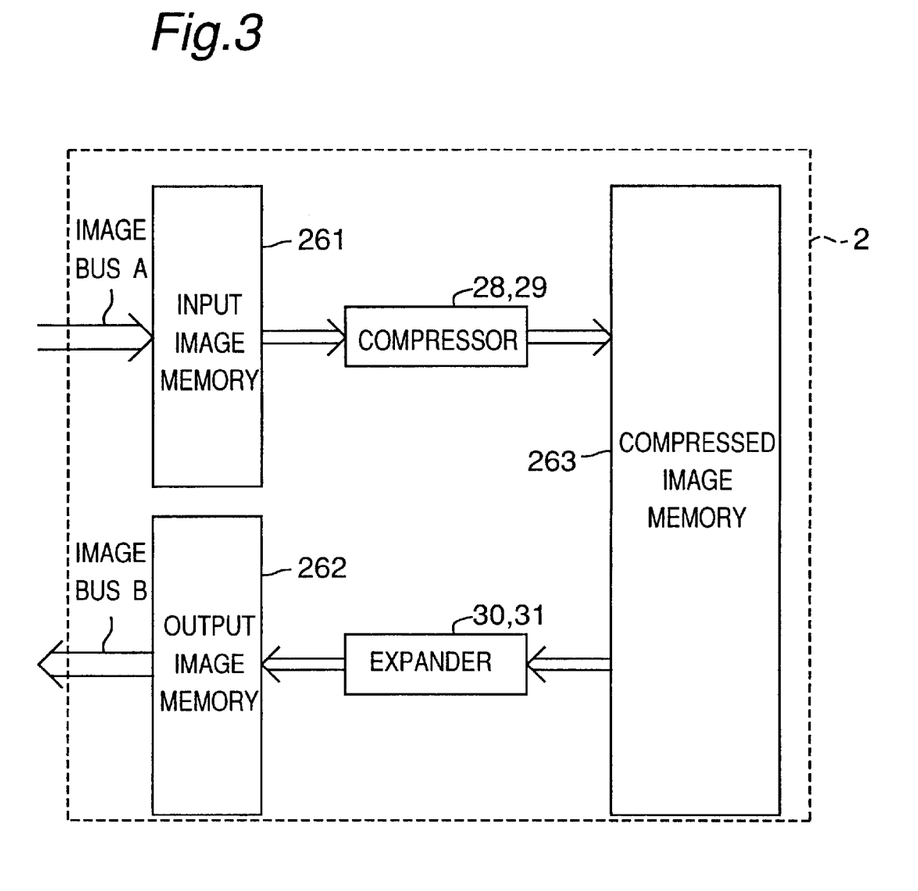
FIG. 3 is a block diagram showing the flow of image data in the image memory section shown in FIG. 2.

FIG. 3 is a block diagram showing the flow of image data in the image memory section 2. As shown in FIG. 3, the image RAM 26 (see FIG. 2) is divided into an input image memory 261, an output image memory 262 and a compressed image memory 263. Transmission of the image data among the memories 261, 262 and 263 is controlled by the DMAC 27 (see FIG. 2). Specifically, image data is transmitted by giving a destination address and the size of data to be transmitted to the DMAC 27. The point to which the image data has been transmitted is determined by reading the transmission counter of the DMAC 27.

The image data obtained by reading the original document in the image reader section 1 is stored in the input image memory 261 via the image bus line A. As mentioned previously, the line to which the image data has been transmitted, or to which line of the input image memory 261 the image data has been input, can be determined by reading the transmission counter of the DMAC 27. The image data stored in the input image memory 261 is compressed by the first compressor 28 and the second compressor 29, and is then transmitted to the compressed image memory 263.

The compressed image data stored in the compressed image memory 263 is expanded by the first expander 30 and the second expander 31, and is then transmitted to the image editor 32 (see FIG. 2). The image data is subjected to editing processes such as rotation in the image editor 32, and is then transmitted to the output image memory 262.

The image data transmitted to the output image memory 262 is then transmitted to the printer section 3 (see FIG. 1) by the DMAC 27 via the image bus line B, so that image corresponding to the image data (original document) is printed on paper. At this time, the last line of the output image memory 262 corresponding to the image data which has been transmitted to the printer section 3 can be determined by reading the transmission counter of the DMAC 27.

The original document is copied by following the image data path described above. Image data obtained by reading the original document in the image reader section 1 is stored in the input image memory 261. At the time when one sheet of original document has been read, image data generated thereby is compressed by the first compressor 28 and the second compressor 29. The compressed image data is transmitted to the compressed image data memory 263. When the compressed image data is transmitted via the first expander 30 and the second expander 31 to the output image memory 262, it is restored into the original image data. Then by sending the image data via the image bus line B to the printer section 3, image (copy) of the original document which was read can be printed.

Now because the compressed image memory 263 can store the image data of a plurality of original document sheets, it is made possible to sort the image data by means of the compressed image memory 263 by using the functions described above. To perform sorting operation, a plurality of original document sheets are continuously read at the start. Then, when the image data is stored in the input image memory 261, the image data is compressed by the first compressor 28 and the second compressor 29, with the compressed image data being stored in the compressed image memory 263.

This operation is repeated to store the compressed image data of all document sheets in the compressed image memory 263. After completing this process, image data of page 1 to page n is consecutively expanded, while the expanded data is sent to the output image data memory 262 and to the printer section 3. When the expansion and output operations are repeated the required number of times, image data can be output in the form of desired arrangement (sorted order) corresponding to the document. Therefore, sorting operation conventionally carried out mechanically can be done through data processing operations by means of memory.

Because the compressed image memory 263 can store a plurality of image data sets, a control table (compressed image control table) is implemented in the RAM 25 for controlling the image data sets.

Figure 4:
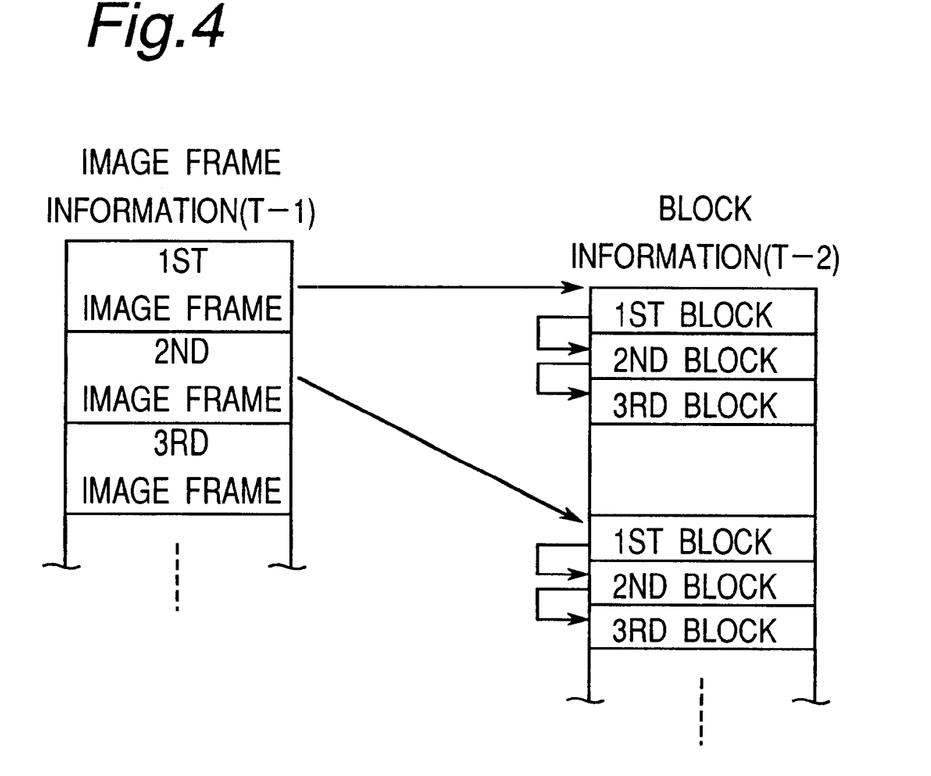
FIG. 4 is a drawing schematically showing the configuration of a compressed image control table.

As shown in FIG. 4, the table contains information (T-1) for each image frame and information (T-2) for each block. The information (T-1) for each image frame contains information of the whole image data such as the entire image data size and the end block of the image data which has been compressed. The information (T-2) for each block contains the information of the image data blocks. Hereupon, in the compressed image control table, there are stored size of the image data of each block before compression, pointer position indicating a particular area of the compressed image memory 263 where the compressed image data is stored, size of the image data of each block after compression, compression time of each of the blocks (time required for compressing the image data) and position of each of the blocks in the image.

Hereinafter, the operation of the digital copying machine will be described. At first, a fundamental image data processing method in the digital copying machine M of the present invention will be described.

In the image data processing, fundamentally, when the image data, which has been divided into a plurality of blocks and then compressed at every block, is expanded at every block by using two expanders 30,31, the difference between the time when the first expander 30 completes its action and the time when the second expander 31 completes its action is reduced by assigning the block of which image data is to be expanded to either of the expanders 30,31 with reference to the compression time of every block. That is, the block of which image data is to be expanded is sequentially assigned to the expander 30,31 in which the total compression time of the blocks had been already assigned thereto is the least, thereby the difference of the total compression time (namely, almost total expansion time) of the blocks assigned to each of the expanders 30,31 is reduced as small as possible so that the timing when printing process starts is quickened.

Hereinafter, the image data processing will be more concretely described. Hereupon, in the present embodiment, although two compressors and two expanders are used, it is a matter of course that the present image data processing can be applied to the digital copying machine in which the number of the compressors or expanders differs from the above (namely two).

Figure 5:
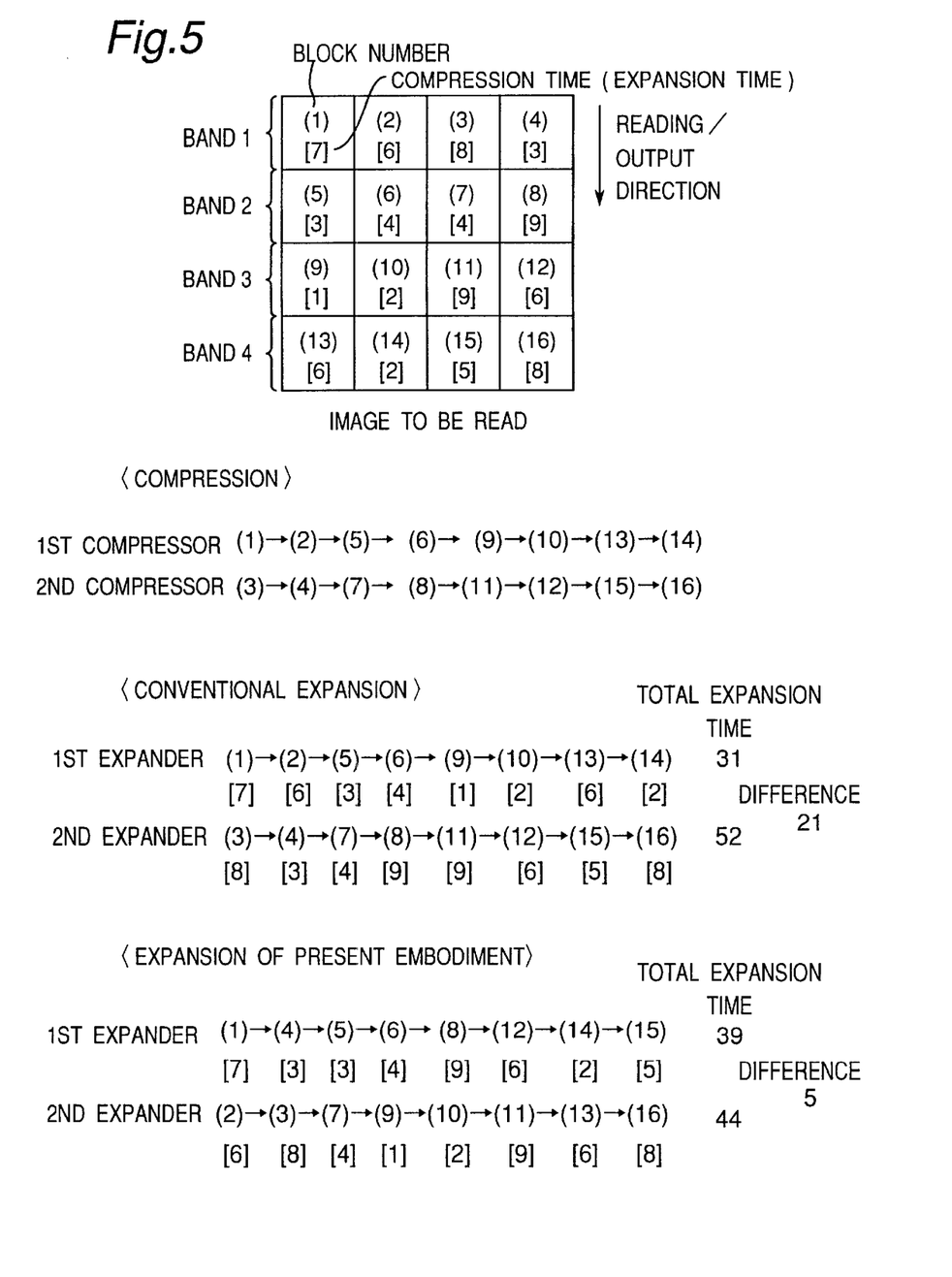
FIG. 5 is a drawing showing the procedure of compressing and expanding image data according to the present invention.

At first, for example, as shown in FIG. 5, the image data which has been already read is divided (partitioned) into a plurality of blocks of predetermined size. Hereupon, as apparent from FIG. 5, in this example, the image data is divided along the vertical direction (auxiliary scanning direction) and the horizontal direction (principal scanning direction) into four blocks respectively, namely divided into sixteen blocks in total. The image data divided into sixteen blocks as described above is compressed at every block (namely, in the unit of block) by using the first compressor 28 and the second compressor 29 according to the assignment or order as shown for example in FIG. 5. At this, the time required for compressing the image data at every block, namely compression time is stored in the compressed image control table. Hereupon, for example, let us suppose that the compression time of the image data of each of the blocks (1) to (16) has such a value as shown in FIG. 5. That is, for example, the compression time of the image data of the block (1) is 7 units (for example, 7 ms (milliseconds)), and the compression time of the image data of the block (2) is 6 units.

Hereupon, it may be considered that the compression time is approximately expansion time with respect to the same image data.

Next, the block of which image data is to be expanded is assigned to either of the expanders 30,31. That is, the blocks are sorted. In such case, according to the conventional method, each of the blocks is simply assigned by means of the same procedure as that of compression processing, as shown in FIG. 5. That is, the image data in the blocks compressed by the first compressor 28 is expanded by the first expander 30 in the same order as that of compression processing. On the other hand, the image data in the blocks compressed by the second compressor 29 is expanded by the second expander 31 in the same order as that of compression processing.

However, according to the conventional assignment procedure (sort procedure) described above, because the compression time is almost equal to the expansion time with respect to the same image data, the total expansion time of the first expander 30 amounts to 31 units, and the total expansion time of the second expander 31 amounts to 52 units. That is, the difference between the total expansion time of the first expander 30 and that of the second expander 31 amount to 21 units. Therefore, the both expanders 30,31 cannot efficiently function because the first expander 30 stops its operation till the second expander 31 completes its expansion processing.

On the other hand, in the digital copying machine M of the present invention, the block of which image data is to be expanded is assigned to the expanders 30,31 according to the following procedure (the blocks are sorted).

That is, at first, a total compression time counter of the first expander 30 and a total compression time counter of the second expander 31 are cleared to zero, respectively (count value is set to zero). Hereupon, each of the total compression time counter refers to a counter for counting the total compression time (namely, almost equal to the total expansion time) of the image data of the blocks assigned to the corresponding expander 30,31, respectively. For example, in case that both of the block (1) whose compression time is 7 units and the block (4) whose compression time is 3 units are assigned to the first expander 30 at a certain point of time, the count value of the total compression time counter of the first expander 30 amounts to 10 units. Hereupon, if the block (5) whose compression time is 3 units is further assigned to the first expander 30, the above compression time of 3 units is added to the total compression time counter so that its count value amounts to 13 units.

Thus, from the block (1) to the block (16), each block is sequentially assigned to the first expander 30 or the second expander 31. Hereupon, each block is assigned to the expander 30,31 of which count value of the total compression time counter is less. When the count value of the total compression time counter of each of the expanders 30,31 is equal to each other, the present block is assigned to the first expander 30.

Figure 6:
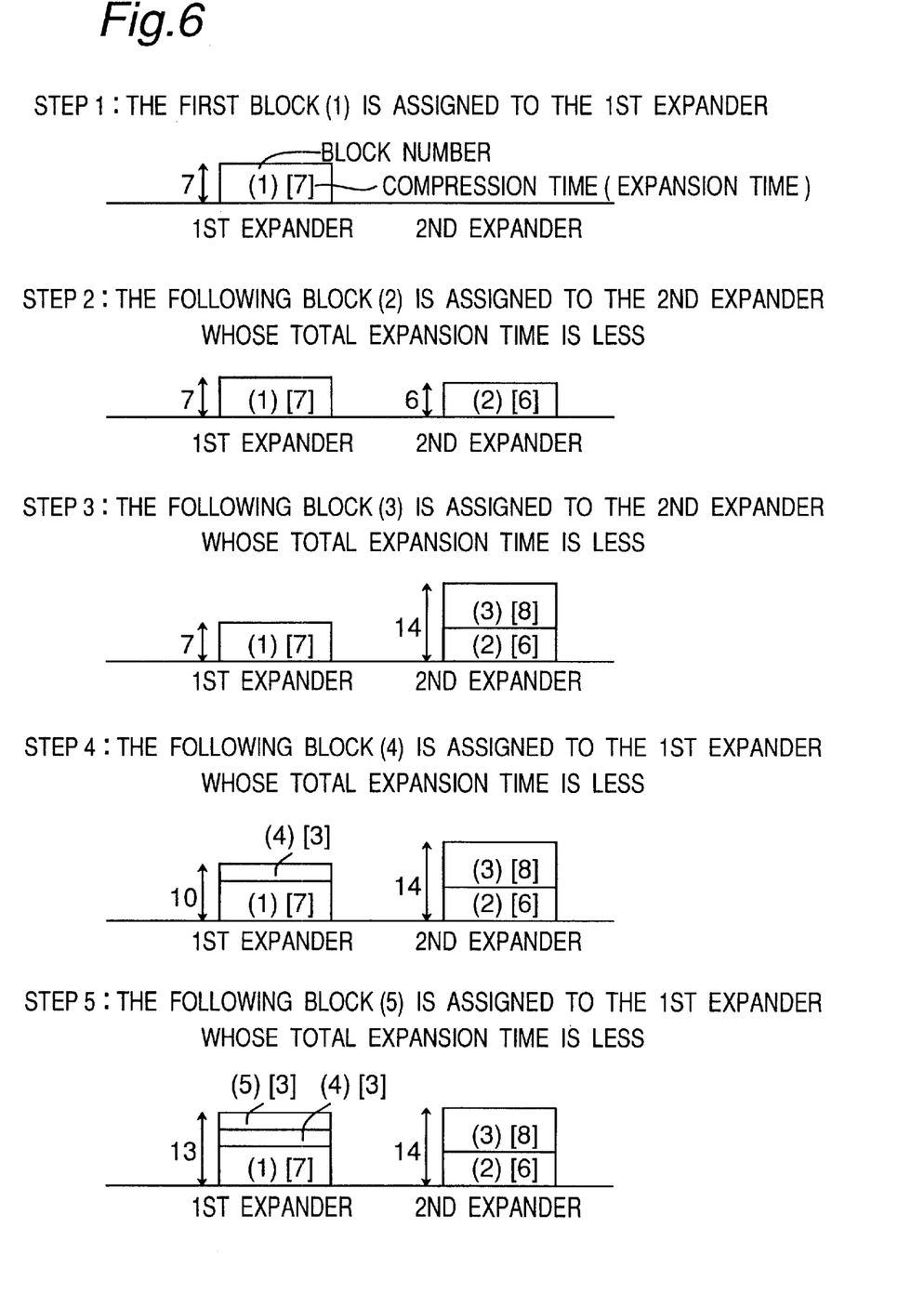
FIG. 6 is a drawing showing the procedure of assigning blocks of image data to two expanders.

More concretely, as shown in FIG. 6, when the first block (1) whose compression time is 7 units is assigned, each of the count values of the total compression time counters of the both expanders 30,31 is equal to zero. Therefore, the block (1) is assigned to the first expander 30 (Step 1). In consequence, although the count value of the total compression time counter of the first expander 30 amounts to 7 units, the count value of the total compression time counter of the second expander 31 retains zero.

The following block (2) whose compression time is 6 units is assigned to the second expander 31 whose count value of the total compression time counter is less (count value: 0) than that of the other expander (Step 2). In consequence, although the count value of the total compression time counter of the first expander 30 retains 7 units, the count value of the total compression time counter of the second expander 31 amounts to 6 units.

The following block (3) whose compression time is 8 units is assigned to the second expander 31 whose count value of the total compression time counter is less (count value: 6) than that of the other expander (Step 3). In consequence, although the count value of the total compression time counter of the first expander 30 retains 7 units, the count value of the total compression time counter of the second expander 31 amounts to 14 units.

The following block (4) whose compression time is 3 units is assigned to the first expander 30 whose count value of the total compression time counter is less (count value: 7) than that of the other expander (Step 4). In consequence, although the count value of the total compression time counter of the first expander 30 amounts to 10 units, the count value of the total compression time counter of the second expander 31 retains 14 units.

The following block (5) whose compression time is 3 units is assigned to the first expander 30 whose count value of the total compression time counter is less (count value: 10) than that of the other expander (Step 5). In consequence, although the count value of the total compression time counter of the first expander 30 amounts to 13 units, the count value of the total compression time counter of the second expander 31 retains 14 units.

Then, similar assignment processing as described above is repeated so that the blocks (6) to (16) are assigned to the first expander 30 or the second expander 31. In consequence, the blocks (1) to (16) are assigned to the expanders 30,31 in the configuration or order as shown in FIG. 5. In the above-mentioned example, the count value of the total compression time counter of the first expander 30, namely the total expansion time of the first expander 30 amounts to 39 units, and further the count value of the total compression time counter of the second expander 31, namely the total expansion time of the second expander 31 amounts to 44 units. That is, the difference between the total expansion time of the first expander 30 and the total expansion time of the second expander 31 amounts to 5 units. Therefore, the lag or difference of the termination time of the operation between both expanders 30,31 may be highly reduced.

Next, the timing when printing can be started is calculated with reference to the unit information in the compressed image control table sorted as described above.

Each of the first expander 30 and the second expander 31 expands the image data of the blocks assigned thereto according to the order of the block unit information in the respective compressed image control table (see FIG. 4). Then, at the timing when printing can be started, copied image corresponding to the original document is printed by the printer section 3.

When the image data, of which configuration is shown in FIG. 5, is expanded at every block, if the block of which image data is to be expanded is simply assigned to the expanders 30,31 according to the conventional procedure, the difference of the total expansion time between the both expanders 30,31 amounts to 21 units as described previously. On the other hand, according to the digital copying machine M of the present invention, the difference of the total expansion time between the both expanders 30,31 amounts to 5 units as described previously. Thus, according to the digital copying machine M of the present invention, the both expanders 30,31 can be efficiently used so that the timing when printing can be started is quickened. In consequence, the speed of expansion processing or print processing is improved.

Hereinafter, the specific method of controlling the image data processing in the digital copying machine M will be described. FIGS. 7 to 12 are flow charts of the image data processing control in the image memory section 2, showing the portions related to the present invention.

Figure 7:
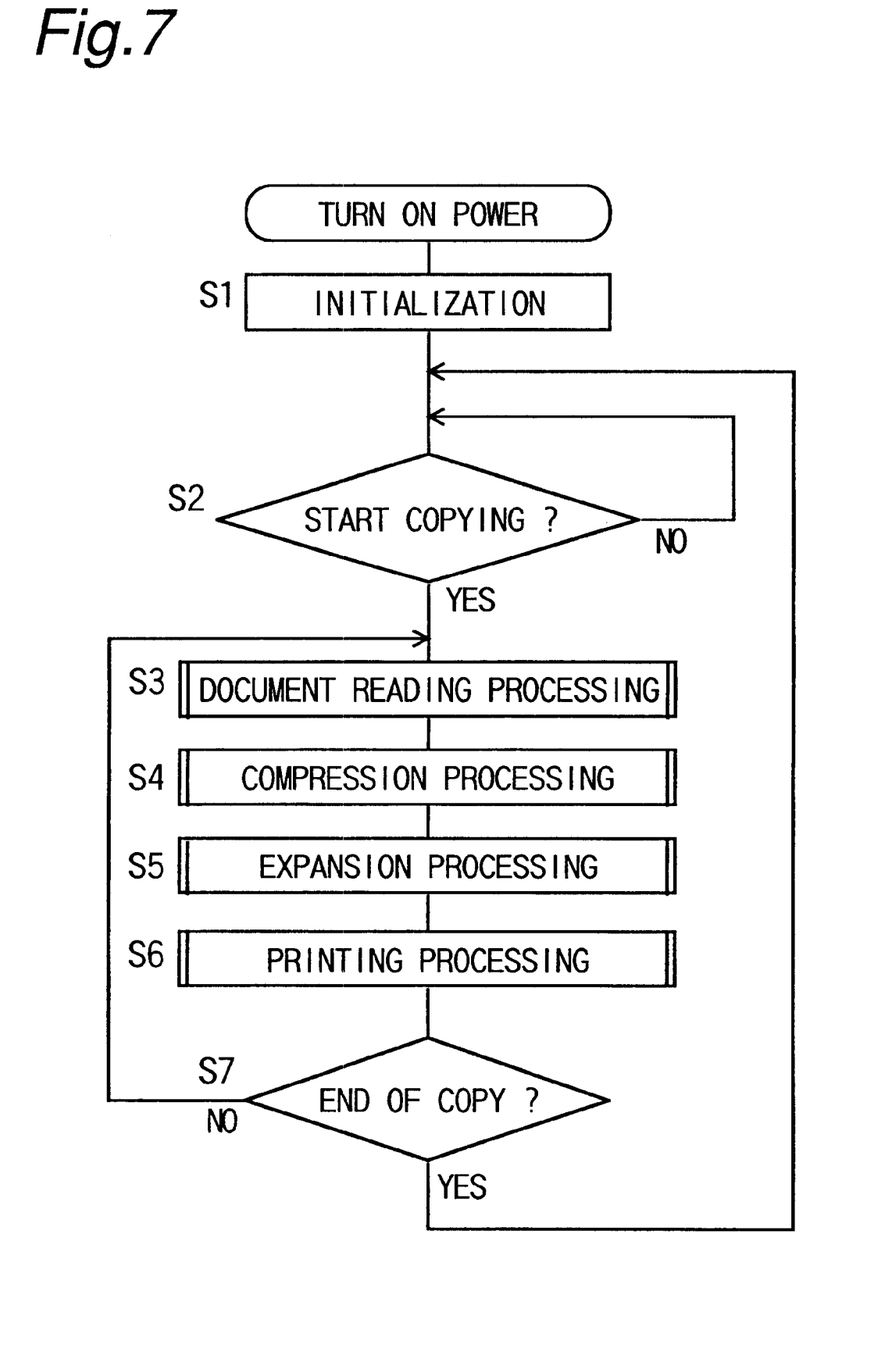
FIG. 7 is a flow chart of a main routine for image data processing control for the digital copying machine shown in FIG. 1.

FIG. 7 shows a main routine for image data processing control. In the main routine, when power is supplied, at first the internal status is initialized (step S1). Thereafter, the system remains in standby loop until start copying command is given (NO in step S2). When start copying command is given (YES in step S2), original document reading process (step S3), compression process (step S4), expansion process including image rotation (step S5) and printing process (step S6) are performed sequentially. These steps (step S3 to step S6) are repeated until copying operation is completed (NO in step S7). When the copying operation is completed (YES in step S7), the system again waits for the start copying command.

Figure 8:
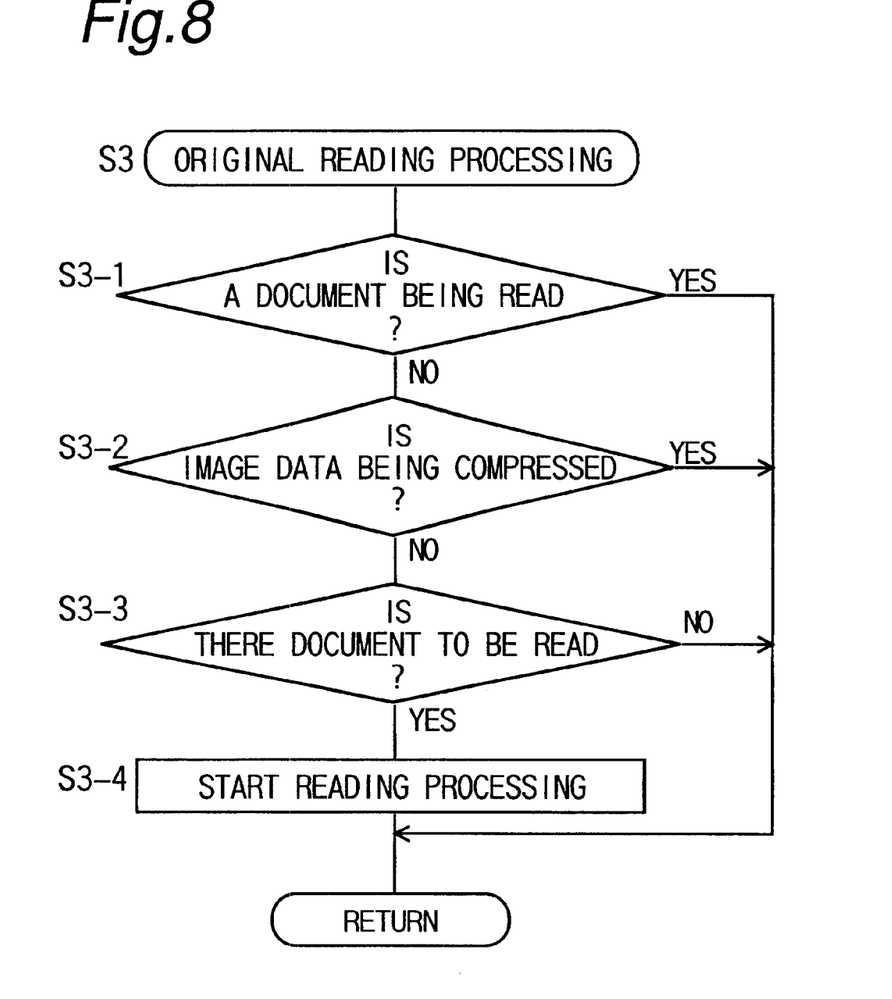
FIG. 8 is a flow chart of a subroutine for original document reading processing.

FIG. 8 is a flow chart showing a specific method of controlling the original document reading process of step S3 in FIG. 7 (subroutine). In this original document reading process, it is determined whether an original document is currently being read or not (step S3-1). When an original document is being read, namely the image reader section 1 is sending image data to the input image memory 261 of the image memory section 2, this processing routine is terminated without evoking any action (YES in step S3-1). On the other hand, when no original document is being read (NO in step S3-1) with no image data being compressed (NO in step S3-2) and there is an original document to be read (YES in step S3-3), reading process is started (step S3-4). Hereupon, the reading process refers to a process of starting the DMAC 27 and issuing read request signal to the control signal line-a to the image reader 1. On the other hand, in case image data is being compressed (YES in step S3-2) or there is no original document to be read (NO in step S3-3), this processing routine is terminated.

Figure 9:
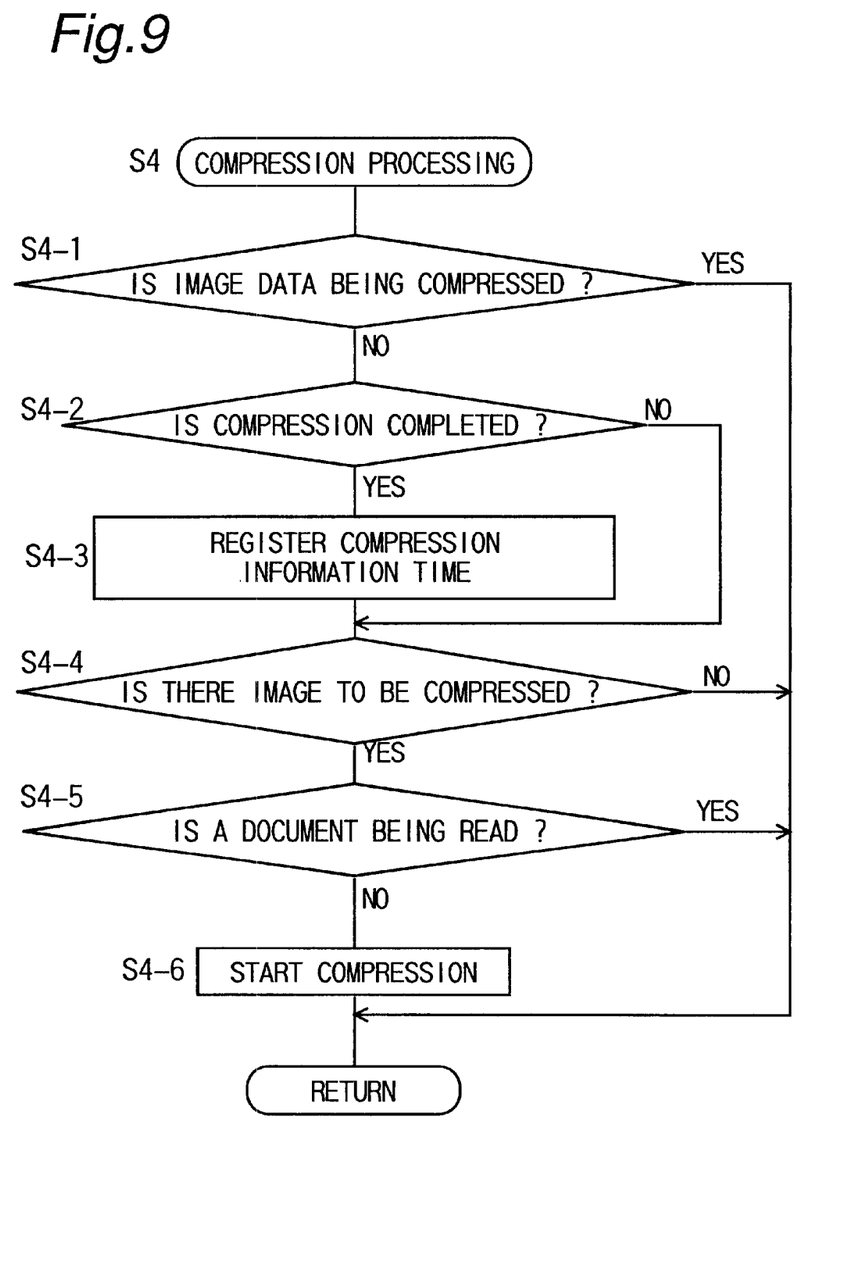
FIG. 9 is a flow chart of a subroutine for compression processing.

FIG. 9 is a flow chart showing a specific method of controlling the compression process of step S4 in FIG. 7 (subroutine). In this compression process, it is first checked to see there is no image data being compressed (NO in step S4-1). In case compression process has just been completed at this time (YES in step S4-2), compression information on the compressed image data, such as compression time etc., is registered in the compressed image control table (step S4-3). In case there is image data to be compressed, (YES in step S4-4), it is confirmed that no original document is being read (NO in step S4-5) and then compression is started (step S4-6) Hereupon, in case the original document is being read (YES in step S4-5), this processing routine is terminated without evoking no action.

In this compression process, while the first compressor 28 and the second compressor 29 are operated, image data stored in the input image memory 261 is sent to the compressors 28, 29 to be compressed. Compressed image data is transferred to the compressed image memory 263.

Transfer of the image data is controlled by the DMAC.27. How much of the image data obtained by reading the original document has been transferred to the input image memory 261 can be known through the transfer counter of the DMAC 27.

Figure 10:
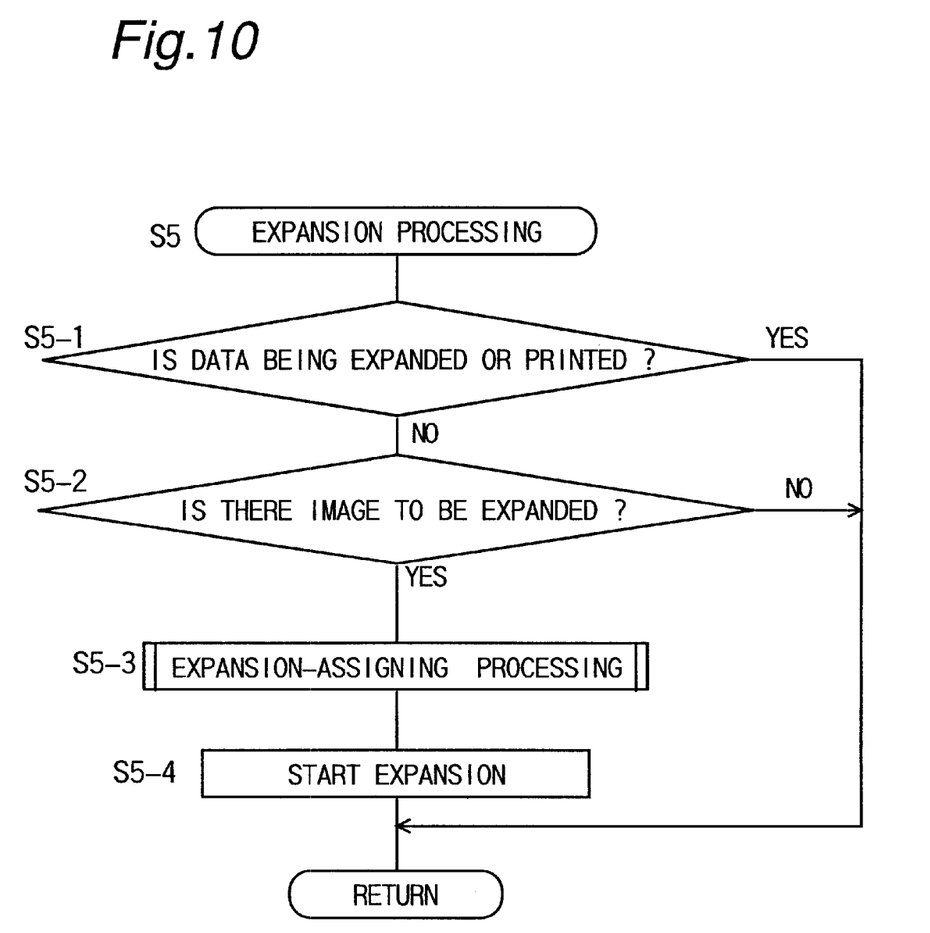
FIG. 10 is a flow chart of a subroutine for expansion processing.

FIG. 10 is a flow chart showing a specific method of controlling the expansion process of step S5 in FIG. 7 (subroutine). In this expansion process, it is first checked to see there is no image data being expanded or printed (NO in step S5-1), and then it is determined from the compression image control table to see whether there is image data to be expanded (step S5-2). When there is image data to be expanded (YES in step S5-2), expansion-assigning process is performed (step S5-3), and then expansion process is started (step S5-4). Hereupon, the expansion-assigning process is performed by determining the order of expanding the blocks generated by dividing the image data according to the assigning procedure described previously (see FIGS. 5 and 6). Further, the expansion process is carried out by starting the both expanders 30, 31. Transfer of the image data is carried out by the DMAC 27.

Figure 11:
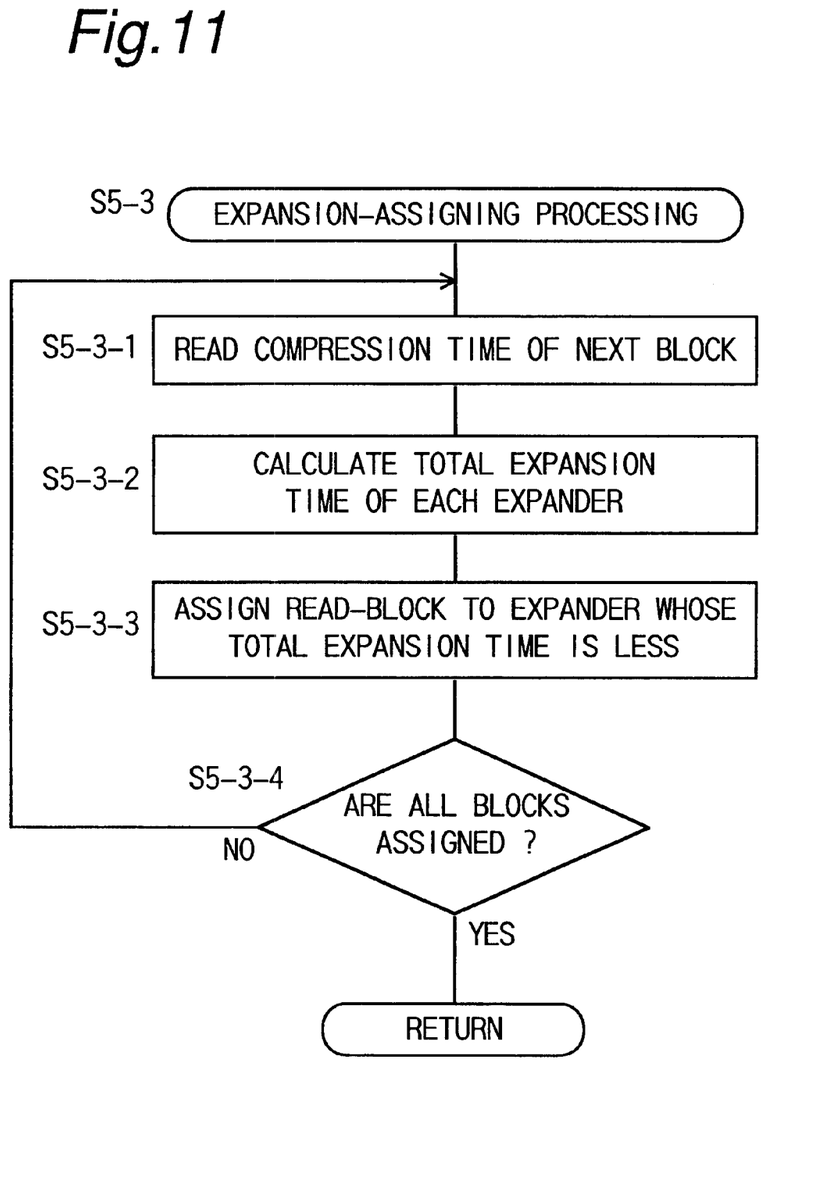
FIG. 11 is a flow chart of a subroutine for expansion-assigning processing.

FIG. 11 is a flow chart showing a specific method of controlling the expansion-assigning process of step S5-3 in FIG. 10 (subroutine). In this expansion-assigning process, at first, the compression time of the image data in the block to be expanded at this time is read (step S5-3-1). Then, with regard to each of the first expander 30 and the second expander 31, the total compression time (namely, total expansion time) at present thereof is calculated (step S5-3-2). Thus, the present block is assigned to the expander whose total compression time, namely total expansion time is less (step S5-3-3). Then, it is determined whether all the blocks are assigned to the first expander 30 or the second expander 31. Hereupon, if all the blocks are not assigned to those (NO in step S5-3-4), steps S5-3-1 to S5-3-4 are repeatedly performed till all the blocks have been assigned. On the other hand, if the assignment of all the blocks have been completed (YES in step S5-3-4), the expansion-assigning process is terminated.

Figure 12:
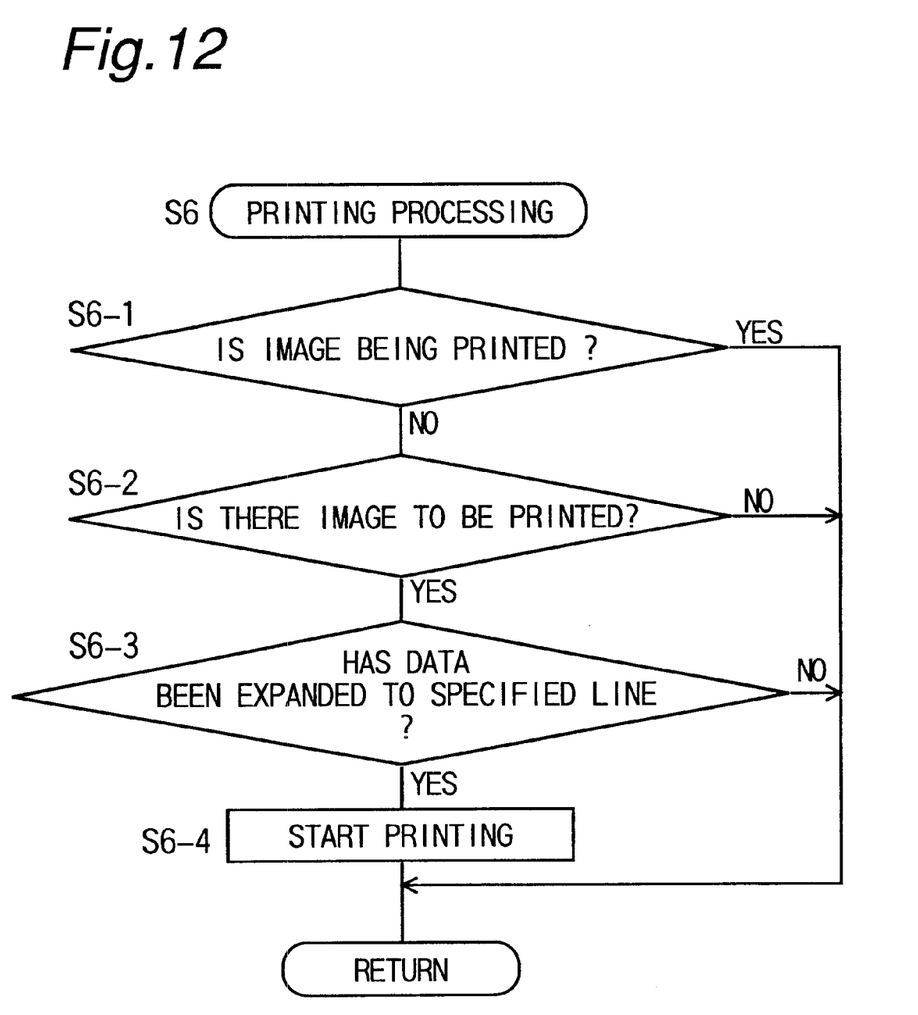
FIG. 12 is a flow chart of a subroutine for printing processing.

FIG. 12 is a flow chart showing a specific method of controlling the printing process of step S6 in FIG. 7 (subroutine). In this printing process, it is first checked to see there is no image data being printed (NO in step S6-1), and then it is determined whether there is image data to be printed (step S6-2). When there is image data to be printed (YES in step S6-2), after confirming that the image data has been expanded up to the print enable line (YES in step S6-3), printing process is started (step S6-4).

In this printing process, after starting the DMAC 27, the printer section 3 is requested via the control signal line a to feed paper or to carry out printing. The printing process is similar to that of conventional printers, and therefore detailed description thereof will be omitted.

As described above, in the digital copying machine according to the present invention, when the image data is compressed at every block and then expanded by using a plurality of expanders, the block to be expanded is assigned to either of the expanders with reference to the compression time of each of the blocks in such a manner that the difference of the total expansion time among the expanders becomes as small as possible. Therefore, when the image data is expanded and then printed, the timing when the printing-process starts is quickened so that the copying speed is improved.

Although the present invention is described above taking specific embodiments as examples, it will be understood by those skilled in the art that the present invention is not limited to these embodiments, but covers all modifications which are within the scope and spirit of the present invention as defined by the appended claims.

What is claimed is:

1. An image data processing apparatus for processing a digital image data comprising:

a plurality of expanders for receiving a compressed image data divided into a plurality of blocks and then expanding the compressed image data to output; and a controller for assigning each of the blocks of compressed image data to the expanders according to a time which each of the expanders requires to expand the compressed image data;

wherein each of the expanders expands the blocks of image data assigned thereto.

2. The image data processing apparatus according to claim 1, wherein the controller has a predictor for predicting a time which each of the expanders requires to expand the blocks of image data which have been already assigned thereto, the controller assigning each of the blocks to the expanders according to the time predicted by the predictor.

3. The image data processing apparatus according to claim 2, wherein the predictor predicts a time required for expanding each of the blocks of image data on the basis of a time consumed for compressing the block of image data.

4. The image data processing apparatus according to claim 1, further comprising a compressor for dividing the image data into a plurality of blocks to compresses the image data in the unit of block, wherein the image data compressed by the compressor is input to the expanders.

5. The image data processing apparatus according to claim 4, wherein the number of the compressor is plural.

6. An image data processing apparatus for processing a digital image data comprising:

a compressor for receiving an image data and then dividing the image data into a plurality of blocks to compress the image data in the unit of block;

a memory for storing the image data compressed by the compressor;

a plurality of expanders for expanding the compressed image data;

a controller for reading the compressed image data in the unit of block from the memory to assign the compressed image data to the expanders, the controller calculating a time which each of the expanders requires to expand the blocks of image data which have been already assigned thereto to assign each of the blocks to any one of the expanders according to the calculated time; and a synthesizer for synthesizing each of the blocks of image data expanded by the expanders to generate one image.

7. The image data processing apparatus according to claim 6, wherein the controller calculates the time which each of the expanders requires to expand the image data on the basis of a time which the compressor has consumed to compress the image data.

8. The image data processing apparatus according to claim 6, the expanders simultaneously expand the block of image data assigned thereto in parallel with one another.

9. The image data processing apparatus according to claim 6, further comprising a printer for performing printing processing on the basis of the image data synthesized by the synthesizer.

10. The image data processing apparatus according to claim 9, further comprising an image reader for reading an original image to generate the image data, the image reader outputting the read image data to the compressor.

11. The image data processing apparatus according to claim 6, wherein the memory has a capacity capable of storing the image data corresponding to a plurality of original image sheets, wherein pages of the image data are sorted by controlling an order of reading the image data from the memory.

12. An image data processing method of processing a digital image data comprising the steps of:

assigning a compressed image data, which is divided into a plurality of blocks and then compressed, to any one of a plurality of expanders;

calculating an expansion time which each of the expanders requires to expand the blocks of image data assigned thereto in the assigning step;

performing repeatedly the assigning step and the calculating step according to the expansion time calculated in the directly previous calculating step; and expanding the blocks of image data assigned to each of the expanders by driving the expanders at the same time.

13. The image data processing method according to claim 12, further comprising the step of:

printing the image data expanded in the expanding step.

14. The image data processing method according to claim 13, further comprising the steps of:

reading an original image to generate the image data; and compressing the image data generated in the reading step in the unit of block to generate the compressed image data to be expanded.

15. The image data processing method according to claim 14, wherein the expansion time is calculated in the calculating step according to a time which has been consumed to compress each of the blocks of image data in the compressing step.

16. The image data processing method according to claim 14, further comprising the step of storing the image data corresponding to a plurality of original image sheets compressed in the compressing step to a memory, and then repeatedly reading the stored image data at plural times, wherein the read image data is expanded in the expanding step.

17. The image data processing method according to claim 12, wherein the image data is assigned to the expanders in such a manner that the expansion time of each of the expanders is close to one another.

* * * * *